United States Patent Office 3,274,185
Patented Sept. 20, 1966

3,274,185
PHTHALAZINE DERIVATIVES
Max V. Sigal, Jr., Gayton, England, Paolo Marchini, Charlottesville, Va., and Buford L. Poet, Bristol, Tenn., assignors to The S. E. Massengill Company, Bristol, Tenn.
No Drawing. Original application Oct. 8, 1963, Ser. No. 314,640. Divided and this application May 3, 1965, Ser. No. 462,162
6 Claims. (Cl. 260—240)

This is a division of our copending application Serial No. 314,640, filed October 8, 1963, now abandoned, for Phthalazine and Quinazoline Derivatives.

The present invention relates to new phthalazine derivatives, and more particularly to such derivatives having a high degree of activity as antidepressants so that the compounds can be used as tranquilizers with a sedative action and as blood pressure depressants.

It is the primary object of the present invention to provide a new series of substituted phthalazines.

It is another object of the present invention to provide a new series of compounds having sedative-tranquilizing action and blood pressure depressant action.

It is yet another object of the present invention to provide for the production of the new substituted phthalazines of this invention.

It is yet another object of the present invention to provide for the method of achieving antidepressant action.

Other objects and advantages of the present invention will be apparent from a further reading of the specification and of the appended claims.

With the above and other objects in view, the present invention mainly comprises substituted 2,3-benzodiazine compounds of the formula:

(I)
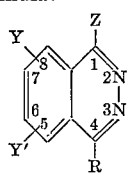

wherein Y and Y' are selected from the group consisting of hydrogen, lower alkyl, lower alkoxy, halogen and methylenedioxy, wherein Z is selected from the group consisting of phenyl, lower alkyl-substituted phenyl, halogen-substituted phenyl, lower alkoxy-substituted phenyl, benzyl, lower alkyl-substituted benzyl, lower alkoxy-substituted benzyl, lower alkyl, thenyl, cyclopentyl, cycloheptyl, 3',4'-methyleneoxyphenyl, 3',4'-methylenedioxy benzyl, amino, hydrazino, mercapto and hydroxyl, and wherein R is selected from the group consisting of hydrogen, hydroxyl, halogen, amino, lower alkylamino, methyleneamino, methylene-lower alkylamino, methyleneaminotrimethylene-lower dialkylamine, hydrazino, benzylhydrazino and lower alkoxy-substituted benzylhydrazino.

Referring more specifically to Formula I above, Y and Y' may be hydrogen, lower alkyl such as methyl, ethyl, propyl and the like, lower alkoxy such as methoxy, ethoxy, isopropoxy and the like, halogen such as chlorine, and methylenedioxy.

In Formula I, Z is most preferably:

Phenyl,
Benzyl,
Thenyl,
p-tolyl,
p-chloro phenyl,
3',4'-dimethoxy benzyl,
3',4'-diethoxy benzyl,
methylendioxy benzyl,
Cyclopentyl, or
Cycloheptyl In Formula I above, R is most preferably:

Hydroxyl,
Chlorine,
Hydrogen,
Amino,

Substituted amino such as:
—CH₂—NH₂ (methylenamino),
—CH₂—N(CH₃)₂ (methylendimethylamino),
—CH₂—N(lower alkyl)₂, and
—CH₂—NH—CH₂—CH₂CH₂N(CH₃)₂,
Hydrazino or
—NH—N—R',
wherein R'

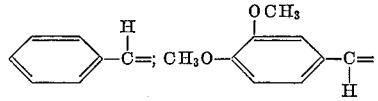

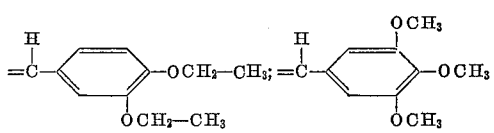

The compounds of the present invention have been found to have a primary action as sedative-tranquilizers and blood pressure depressants. It is possible to achieve an anti-depressant action by administering the compounds of the present invention to patients requiring the same.

In addition, the compounds of the present invention have also been found to have a potent antihistaminic activity.

The substituted 1,3-benzodiazine compounds of Formula I above can be produced by reacting the substituted phenylacetic acid with the chosen substituted phthalic anhydride to give a substituted benzal phthalide which is reacted with hydrazine to form the corresponding phthalazone. Replacement of the hydroxyl in 1-position is accomplished in the usual manner with POCl₃. The corresponding phthalazine is produced by catalytic reduction at room temperature.

Direct reaction of the compound in which R is chlorine with hydrazine or ammonia results in the production of the corresponding hydrazine or amino substituted phthalazine.

In the case wherein Z is cycloalkyl, the condensation of the cycloalkylhalide and magnesium with the chosen substituted phthalic anhydride results in the corresponding phthalide which is further reacted as described above.

The following examples are given to further illustrate the present invention. The scope of the invention is not, however, meant to be limited to the specific details of the examples.

EXAMPLE 1

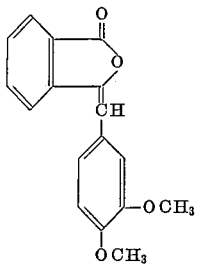

3',4'-dimethoxybenzalphthalide

Phthalic anhydride (31 g.), 3,4-dimethoxy phenylacetic acid (48 g.) and freshly fused sodium acetate (1 g.) are combined in a round-bottomed flask arranged for downward distillation. The mixture is heated rapidly to 230° C. The temperature is raised slowly to 240° C. over a period of two hours. The reaction is maintained at 240° C. until the distillation of water ceases. The flask is cooled to 90–95° C. and the crude product crystallized from absolute ethyl alcohol to yield 34 g. (M.P. 132–133° C.).

Calc. for $C_{17}H_{14}O_4$: C, 72.32; H, 4.95. Found: C, 71.80; H, 4.99.

EXAMPLE 2

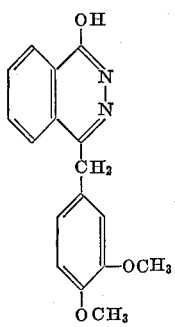

*1-(3',4'-dimethoxybenzyl)-4-hydroxy phthalazine*

3',4'-dimethoxybenzalphthalide (35 g.) are dissolved in ethyl alcohol (200 ml.) with hydrazine (12 ml.). The mixture is refluxed for four hours, cooled, and allowed to stand overnight. The crystalline product is filtered and recrystallized from absolute ethyl alcohol to yield 34.5 g. (M.P. 193–194° C.).

Calc. for $C_{17}H_{16}N_2O_3$: C, 68.93; H, 5.40; N, 9.46. Found: C, 68.22; H, 5.24; N, 9.20.

EXAMPLE 3

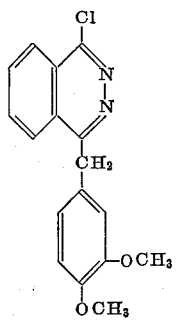

*1-(3',4'-dimethoxybenzyl)-4-chlorophthalazine*

A suspension of 1-(3',4'-dimethoxybenzyl)-4-hydroxyphthalazine (10 g.) in phosphoryl chloride (40 ml.) is refluxed for one hour. The excess phosphoryl chloride is evaporated in vacuo. The residue is poured over crushed ice and neutralized with 10% sodium carbonate. The resulting mixture is extracted with chloroform. The chloroform extract is dried over anhydrous calcium chloride, filtered, and evaporated to dryness. The crude product is crystallized from absolute ethyl alcohol to yield 9 g. (M.P. 130–132° C.).

Calc. for $C_{17}H_{15}ClN_2O_2$: C, 64.86; H, 4.80; N, 8.90; Cl, 11.27. Found: C, 65.31; H, 5.12; N, 8.80; Cl, 11.23.

EXAMPLE 4

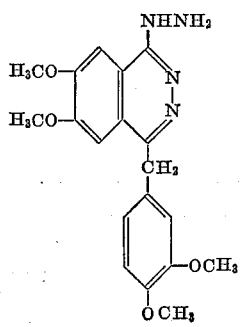

*1-(3',4'-dimethoxy) benzyl-4-hydrazino-6,7-dimethoxy phthalazine*

1-(3',4'-dimethoxy) benzyl-4-chloro-6,7-dimethoxy phthalazine (6 g.) is added to ethyl alcohol (50 ml.) containing hydrazine (25 ml.) and refluxed for ten hours. The mixture is cooled overnight at 4° C. The precipitate is collected by filtration and recrystallized from absolute methanol to yield 2 g. (M.P. 112° C., recrystallized at 120° C., final M.P. 178–179° C.).

Calc. for $C_{19}H_{22}N_4O_4 \cdot CH_3OH$: C, 59.86; H, 6.20; N, 13.96. Found: C, 60.04; H, 6.31; N, 13.65.

EXAMPLE 5

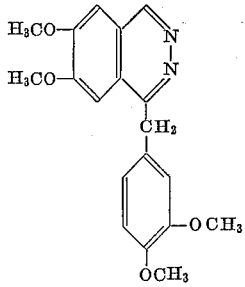

*1-(3',4'-dimethoxy)benzyl-6,7-dimethoxy phthalazine*

1-(3',4'-dimethoxy)benzyl-4-chloro-6,7-dimethoxy phthalazine (2 g.) in ethyl alcohol (280 ml.) containing potassium hydroxide (0.82 g.) is hydrogenated in the presence of palladium on charcoal, 5% catalyst (2 g.). After the reaction is complete, the mixture is filtered and evaporated in vacuo. 30% sodium hydroxide (2 ml.) is added and the mixture extracted with benzene. The benzene extract is concentrated in vacuo to 1.5 ml. and ethyl ether (2 ml.) is added. The resulting white precipitate is filtered and crystallized twice from ethyl acetate-petroleum ether (2:1) to yield 0.9 g. (M.P. 120–121° C.).

Calc. for $C_{19}H_{20}O_4N_2$: C, 67.07; H, 5.87; N, 8.23. Found: C, 67.48; H, 5.79; N, 8.12.

EXAMPLE 6

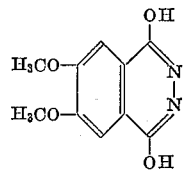

*6,7-dimethoxy-1,4-dihydroxy phthalazine* m-Hemipenic anhydride (10 g.) is combined in ethyl alcohol (150 ml.) with hydrazine (5 g.) and refluxed for twelve hours. After cooling, the white material is dissolved in dilute ammonium hydroxide. The clear solution is acidified with hydrochloric acid. The resulting precipitate is collected by filtration and recrystallized from glacial acetic acid to yield 8 g. (M.P. 333–335° C. dec.)

Calc. for $H_{10}H_{10}N_2O_4$: C, 54.06; H, 4.50; N, 12.61. Found: C, 54.04; H, 4.23; N, 12.30.

EXAMPLE 7

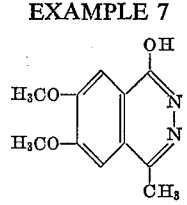

$C_{11}H_{12}N_2O_3$; *6,7-dimethoxy-1-methyl-4-hydroxy phthalazine*

M.P. 249–259° C. d. Theory: C, 60.28; H, 5.01; N, 12.78. Found: C, 59.72; H, 5.33; N, 12.73.

EXAMPLE 8

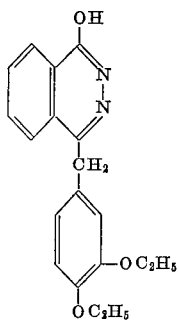

$C_{19}H_{20}N_2O_3$; 1-(3',4'-diethoxybenzyl)-4-hydroxy-phthalazine

M.P. 249–259° C. d. Theory: C, 60.28; H, 5.01; N, 12.78. Found: C, 59.72; H, 5.33; N, 12.73.

EXAMPLE 9

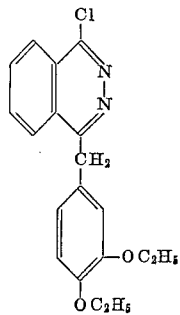

$C_{19}H_{19}N_2ClO_2$; 1-(3',4'-diethoxybenzyl)-4-chlorophthalazine

M.P. 102° C. Theory: C, 66.56; H, 5.59; Cl, 1034; N, 817. Found: C, 67.21; H, 5.79; Cl, 10.12; N, 7.85.

EXAMPLE 10

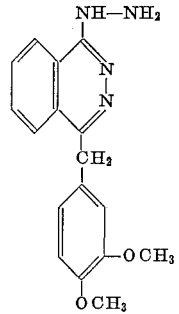

$C_{17}H_{18}N_4O_2$; 1-(3',4'-dimethoxybenzyl)-4-hydrazino phthalazine

M.P. 150–152° C. Theory: C, 65.81; H, 5.80; N, 18.06.

EXAMPLE 11

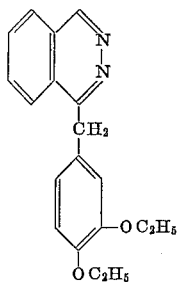

$C_{19}H_{20}N_2O_2$; 1-(3',4'-diethoxybenzyl)phthalazine

M.P. 125–127° C. Theory: C, 74.03; H, 6.48; N, 9.09. Found: C, 73.76; H, 6.07; N, 9.32.

EXAMPLE 12

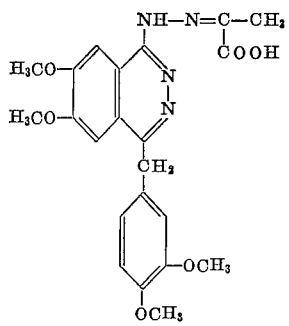

1-pyruvilidene-2-(1'-3'',4''-dimethoxybenzyl-6',7'-dimethoxyphthalazinyl)hydrazine 1 - (3',4' - dimethoxybenzyl) - 4 - hydrazino - 6,7 - dimethoxyphthalazine (2 g.) and pyruvic acid (0.45 g.) are dissolved in ethyl alcohol (150 ml.) and refluxed for 12 hours. The solution is evaporated to dryness, and the residue recrystallized from absolute methanol to yield 0.7 g. (M.P. 210–215° C., dec.).

Calc. for $C_{22}H_{26}N_4O_6$: C, 60.01; H, 5.45; N, 12.72. Found: C, 60.52; H, 4.48; N, 12.66.

EXAMPLE 13

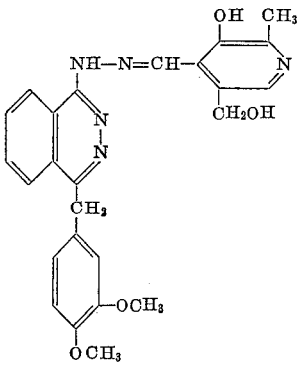

1-(2-methyl-3-hydroxy-5-hydroxymethyl)pyridylene-2-(3',4'-dimethoxybenzyl phthalazinyl hydrazine Pyridoxal hydrochloride (0.2 g.) in 2 ml. of ethyl alcohol is added to a solution of 1-(3',4'-dimethoxybenzyl)-4-hydrazino phthalazine in 20 ml. of ethyl alcohol. After standing thirty minutes at room temperature, the mixture is refluxed for two hours. The solution is evaporated to a small volume. The resulting precipitate is recovered by filtration and recrystallized from ethyl alcohol to yield 0.3 g. (M.P. 157–159° C. dec.).

Calc. for $C_{25}H_{25}N_5O_2 \cdot HCl \cdot 2H_2O$: C, 56.45; H, 5.64; N, 13.17. Found: C, 56.14; H, 5.64; N, 12.67.

EXAMPLE 14

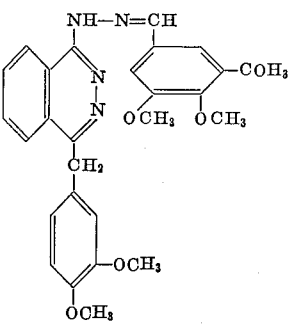

1-(3',4',5'-trimethoxybenzylidene)-2-(3'',4''-dimethoxybenzyl)phthalazinyl hydrazine 1-(3',4',-dimethoxybenzyl) - 4-hydrazino phthalazine (1.5 g.) and 3,4,5-trimethoxybenzaldehyde (1.0 g.) in ethyl alcohol (160 ml.) are refluxed for two hours. The solution is concentrated to one-third volume. The resulting precipitate is collected and recrystallized twice from ethyl alcohol to yield 1 g. (M.P. 159–160° C.).

Calc. for $C_{27}H_{28}N_4O_5$: C, 66.36; H, 5.79; N, 11.46. Found: C, 66.14; H, 5.84; N, 10.86.

The pharmacological activity of the compounds of the present invention is illustrated in the table below:

4. 1-pyruvilidene-2-(1'-3'',4'' - dimethoxybenzyl - 6',7'-dimethoxyphthalazinyl) hydrazine.

5. 1-(2-methyl-3-hydroxy - 5-hydroxymethyl)pyridylene-2-(3',4'-dimethoxybenzyl phthalazinyl) hydrazine.

6. 1-(3',4',5' - trimethoxybenzylidene) - 2-(3'',4''-dimethoxybenzyl)phthalazinyl hydrazine.

| Chart #1 | Adrenolytic Activity, Dog | Hypotensive Activity, Hypertensive Animals | | | Muscle Bath, Rat ileum—Atropine, 1. | Muscle Bath, GP ileum—Diphenhydramine, 1. | Intact Rabbit Histamine, 1 mg./kg. iv.—Protective dose | Coronary dilation, Langendorff Preparation—Rabbit heart, Papaverine, 1. |
|---|---|---|---|---|---|---|---|---|
| | | Dog | Cat | Rat | | | | |
| 1-(3',4'-dimethoxybenzyl)-4-hydrazino phthalazine. | +++ 1 mg./kg. | ++ | + | ++ | .0003 | .025 | 5 mg./kg. iv. | 1 |
| | | 1 mg./kg. iv. | | | | | | |
| 4-phenyl-2-hydroxyquinazoline. | + 1 mg./kg. iv. | + | + | + | .05 | .025 | 5 mg./kg. iv. | .2 |
| | | 1 mg./kg. iv. | | | | | | |

| Chart #2 | Conditioned Avoidance—Rats | Sleeping Time, Pentobarbital Potentiation—Mice | Decrease Reserpine Depression in Rats and Mice |
|---|---|---|---|
| 1-(3',4'-dimethoxybenzyl)-4-hydrazino phthalazine. | + 5 mg./kg. iv. | 10/kg.+50% 10 mg./kg. ip. | — |
| 4-phenyl-2-hydroxy quinazoline. | — 5 mg./kg. iv. | 10 mg./kg.+20% ip. | — |

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. 1-(3',4'-dimethoxybenzyl)-4-hydroxy phthalazine.
2. 1-(3',4'-dimethoxy) benzyl-4-hydrazino-6,7-dimethoxy phthalazine.
3. 6,7-dimethoxy-1,4-dihydroxy phthalazine.

References Cited by the Examiner
UNITED STATES PATENTS 2,484,029 10/1949 Hartman et al. _____ 260—250
3,012,033 12/1961 Engelbrecht et al. __ 260—250

OTHER REFERENCES

Aggarwall et al.: Journal Chemical Society, 1930, pp. 2354–57.

Druey et al.: Journal of Medicinal and Pharmaceutical Chemistry, vol. I, No. 1 (1959), pp. 1–7.

ALEX MAZEL, *Primary Examiner.*

HENRY R. JILES, *Examiner.*

JAMES H. TURNIPSEED, *Assistant Examiner.*